(12) United States Patent
Giuliani et al.

(10) Patent No.: US 8,011,493 B2
(45) Date of Patent: Sep. 6, 2011

(54) DEVICE FOR CHANGING THE PITCH BETWEEN ARTICLES BEING CONVEYED AND ROTATING THESE ARTICLES

(75) Inventors: Cristian Giuliani, Pineto (IT); Dario Galante, Vasto (IT); Massimiliano Lombardi, Montesilvano (IT)

(73) Assignee: Fameccanica.Data S.p.A., Sambuceto di San Giovanni Teatino (Chieti) (IT)

( * ) Notice: Subject to any disclaimer, the term of this patent is extended or adjusted under 35 U.S.C. 154(b) by 84 days.

(21) Appl. No.: 12/522,627

(22) PCT Filed: Dec. 3, 2007

(86) PCT No.: PCT/IB2007/003858
§ 371 (c)(1),
(2), (4) Date: Sep. 25, 2009

(87) PCT Pub. No.: WO2008/087479
PCT Pub. Date: Jul. 24, 2008

(65) Prior Publication Data
US 2010/0012458 A1   Jan. 21, 2010

(30) Foreign Application Priority Data
Jan. 17, 2007   (EP) .................................... 07425020

(51) Int. Cl.
B65G 47/24 (2006.01)
(52) U.S. Cl. ........................ 198/411; 198/406
(58) Field of Classification Search .................. 198/400, 198/406, 408, 411, 471.1, 475.1
See application file for complete search history.

(56) References Cited

U.S. PATENT DOCUMENTS
5,647,190 A * 7/1997 Minarelli et al. ............. 198/411
(Continued)

FOREIGN PATENT DOCUMENTS
EP   1 162 162   12/2001
(Continued)

OTHER PUBLICATIONS
Written Opinion of the International Searching Authority for PCT/IB2007/003858, mailed Apr. 25, 2008.

*Primary Examiner* — James R Bidwell
(74) *Attorney, Agent, or Firm* — Nixon & Vanderhye P.C.

(57) ABSTRACT

A device for carrying out a repitching operation, i.e., for changing the pitch between articles (A) comprised in a flow of moving articles, includes one or more conveying elements (12) for the articles (A) that are to follow a path of orbital movement about a principal axis (X10) between a position of picking-up (T) and a position of release (G) of the articles (A) themselves. The speed of said orbital movement is selectively variable (39, 37, 36) in the passage between the aforesaid positions of picking-up (T) and of release (G) so as to modify the pitch between the articles (A) carried by the conveying elements (12). Said conveying elements (12) are likewise orientable about a respective axis (X12) oriented in a radial direction with respect to the principal axis (X10) so as to modify the orientation of the articles (A) in the passage between the position of picking-up (T) and the position of release (G). There is present at least one cam formation (160), the cam profile of which follows the path of orbital movement of the conveying elements (12) about the principal axis (X10). The conveying element or each conveying element (12) is provided with a cam-follower element (158a, 158b) that can co-operate in a relationship of following with the aforesaid cam formation (160) for determining the orientation assumed by the respective conveying element (12) in the position of picking-up (T) and of release (G), irrespective of the speed of the aforesaid orbital movement.

17 Claims, 5 Drawing Sheets

U.S. PATENT DOCUMENTS

| | | | |
|---|---|---|---|
| 5,988,354 A * | 11/1999 | Spatafora et al. | 198/411 |
| 6,227,541 B1 * | 5/2001 | Couillard et al. | 198/408 |
| 6,848,566 B2 * | 2/2005 | Harnish et al. | 198/461.1 |
| 2004/0262127 A1 | 12/2004 | Harnish et al. | |

FOREIGN PATENT DOCUMENTS

| | | |
|---|---|---|
| EP | 1 209 381 | 5/2002 |
| EP | 1 772 403 | 4/2007 |
| WO | 2006/033370 | 3/2006 |

* cited by examiner

DEVICE FOR CHANGING THE PITCH BETWEEN ARTICLES BEING CONVEYED AND ROTATING THESE ARTICLES

This application is the U.S. national phase of International Application No. PCT/IB2007/003858, filed 3 Dec. 2007, which designated the U.S. and claims priority to European Application No. 07425020.0, filed 17 Jan. 2007, the entire contents of each of which are hereby incorporated by reference.

FIELD OF THE INVENTION

The invention relates to devices that enable change of the pitch (operation also known as "pitch change" or "repitching") between articles being conveyed.

The invention has been developed with particular attention paid to its possible application to the manipulation of sanitary articles, such as sanitary pads, panty liners, etc. The scope of the invention is not in any case limited to this possible field of application.

DESCRIPTION OF THE RELATED ART

The known art regarding repitching devices is somewhat extensive, also in terms of the relevant patent literature.

In this connection, reference may be made, for example, to documents, such as U.S. Pat. No. 4,880,102, U.S. Pat. No. 5,480,021, or U.S. Pat. No. 4,506,779 and also to U.S. Pat. No. 4,726,876, U.S. Pat. No. 3,728,191, and U.S. Pat. No. 4,483,351 and EP-A-1 179 495. From the latter three documents cited there is known the possibility of obtaining, together with the variation of the pitch, an orientation of the articles with a combined action, referred to as "turn and repitch".

In a specific way, the solution described herein arises as a development of the solution described in the European patent application No. 05425692.0, which forms part of the state of the art under provisions of Article 54 (3) of the European Patent Convention.

OBJECT AND SUMMARY OF THE INVENTION

The European patent application No. 05425692.0 describes a device for changing the pitch between articles in a flow of moving articles comprising at least one element for conveying the articles that is to perform an orbital movement about a principal axis between a position of picking-up and a position of release of the articles, the speed of said orbital movement being selectively variable in the transition between said positions of picking-up and release.

Preferentially, the device comprises a plurality of said conveying elements (so-called "shoes") carried by a plurality of respective coaxial shafts which can turn about said principal axis.

This solution has yielded altogether satisfactory applicational results. There has consequently emerged the need to extend its potential of use from the repitching function to the turn-&-repitch function, in which the variation of the pitch is also accompanied by the rotation (for example through 90° or 180°) of the articles, said rotation being possibly performed in a selective way, not subjecting to rotation all of the articles but, for example, turning just one article out of two.

The possibility of associating to the repitching function the turn function has, on the other hand, already been envisaged in the European patent application No. 05425692.0. There is, however, felt the need to have available a solution in which the possibility of adapting the repitching function in a simple and automatic way (intervening only on functions of device control, without having to proceed to replacement of parts) to articles of different format ("change of format") and/or to different values of pitch between the incoming and outgoing articles does not affect execution of the turn function, requiring, for example, interventions of regulation, calibration, etc.

The object of the present invention is to solve the above problem.

According to the present invention, said object is achieved thanks to a device having the characteristics recalled specifically in the ensuing claims.

The claims form an integral part of the disclosure of the invention provided herein.

The solution described herein is suited, for example, to solving the problem of rotation of the articles in the direction of their orientation so that, for example, articles that advance "lengthwise" at input to the turn-&-repitch device advance "crosswise" at output from said turn-&-repitch device, which—in addition to modifying their pitch—has also rotated them, in the case in point through 90°.

In the solution described herein, the repitching function is adaptable in a simple and automatic way—by intervening only on functions of control of the device, without having to proceed to replacement of parts—to articles of different format ("change of format") and/or to different values of pitch between the incoming and outgoing articles. The adaptation of the repitching function does not affect execution of the turn function, and, in a dual way, the criteria of execution of the turn function can be modified without this affecting execution of the repitching function.

The solution described herein is suited to being used advantageously in the context of the solution described in the European patent application No. 07425001.0, filed in the name of the present applicant, in particular for carrying out simultaneously the functions described herein with reference to the units 300 and 400 appearing in FIG. 7 of said patent application (rotation through 180° of one side panel out of two with simultaneous change of the pitch from the input value P1 to the output value P2).

BRIEF DESCRIPTION OF THE ANNEXED DRAWINGS

The invention will now be described, purely by way of non-limiting example, with reference to the annexed drawings, in which.

DETAILED DESCRIPTION OF EXEMPLARY EMBODIMENTS

Figure 1:
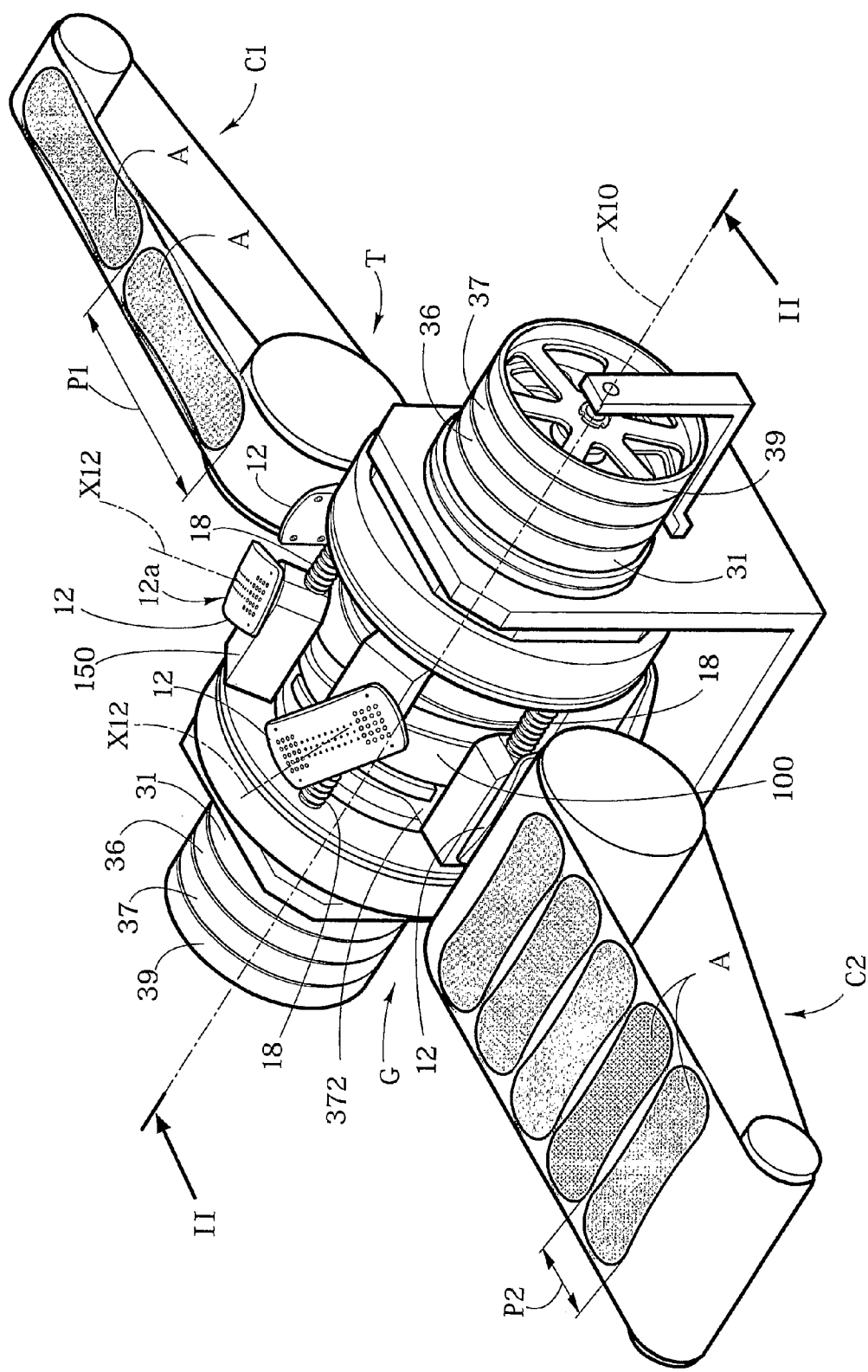
FIG. 1 is a general perspective view of a device as described herein.

In general terms, the device according to the invention, designated as a whole by 10 in the figures, is designed to enable transfer of the articles A:

from an input conveyor C1, where the articles A advance "lengthwise" with a pitch P1, to an output conveyor C2, where the articles A advance "crosswise" with a pitch P2, in a situation where the articles A are subjected both to an operation of "turn" (rotation—through 90°, in the case exemplified herein) and to an operation of repitching with change of the pitch from P1 to P2, where P2 is less than P1.

It will be appreciated on the other hand that the aforesaid values are given purely by way of example: it is in fact evident that, for example, the angle of rotation imparted on the articles A can be different from 90° and/or P2 can be greater than P1. Again, the action of rotation can involve also just some of the articles A, for example one article out of two and not all the articles A.

Since the device 10 illustrated herein can, on the other hand, rotate both in a clockwise direction and in a counterclockwise direction, it presents the advantage of being installable indifferently on "right-handed" machines or "left-handed" machines, i.e., on machines operating in opposite directions.

Just to make the explanation clearer, the articles A (represented schematically just in FIG. 1) can be constituted by sanitary articles, such as, for example, sanitary pads, panty liners, etc. As has already been mentioned previously, the reference to this possible application must not in any case be interpreted as in any way limiting the scope of the invention.

The conveyors C1 and C2 can be conveyors of any type commonly used in the art. By way of schematic illustration, in FIG. 1 reference is made to two conveyors C1 and C2 of the motor-driven belt type. Conveyors of this type, provided with corresponding means (for example, suction means) for withholding the articles A thereon during the movement of conveying, are known in the art and hence are such as not to require a detailed description herein. What is significant for the purposes of an understanding of the invention is the fact that on the two conveyors C1 and C2 the articles A advance with pitches P1, P2 that are different from one another.

Purely by way of orientative example, it may be assumed that the two positions or areas T and G, respectively i) of gripping or picking-up of the articles A from the conveyor C1 and ii) of deposit or release of the articles A on the conveyor C2, are diametrally opposite with respect to the device 10, which rotates (for example in a clockwise direction, as viewed in the figures) about a respective principal axis X10.

The nature of the articles A and of the conveyors C1 and C2, as well as the relative location of the areas or positions of picking-up T and of release G could, however, be altogether different from the ones illustrated herein, as demonstrated, for example, by the different documents according to the known art cited in the introductory part of the present description.

Useful reference may be made to said documents for a general illustration of the principle exploited for the purpose of performing the desired action of change of pitch. According to said principle, the articles A are picked up from the conveyor C1 in the position T with a (peripheral) speed v1 and transferred to the conveyor C2 in the position G with a (peripheral) speed v2, which can be greater or smaller than v1 according to whether it is intended to reduce or increase the pitch between the articles A.

It will be appreciated that, by indicating with ω and r, respectively, the angular velocity of rotation of the device 10 about the axis X10 and the radius of the orbital movement of the articles A, it is not in general imperative that one of the two speeds v1 and v2 considered previously should correspond to the product ωr. Both the speed v1 and the speed v2 can be regulated with an action of modulation (increase or decrease) of the peripheral speed imparted, respectively, in the position of picking-up T and of release G, on the conveying elements ("shoes") 12 of the device 10 designed to perform the action of gripping, withholding/conveying and release of the articles A.

In general terms, it may hence be stated that the device 10, designed to change the pitch between the articles A comprised in a flow of moving articles, includes at least one conveying element 12 for the articles A, which is to describe a path of orbital motion about the principal axis X10 between a position of picking-up T and a position of release G of the articles A, the speed of the orbital movement being selectively variable in the passage between the position of picking-up T and the position of release G.

In the specific case illustrated herein, the device 10 is provided with six gripping or conveying elements or shoes 12 that can be viewed as ideally distributed with angles of separation of 60° about the peripheral development of the device 10: "ideally", in so far as operation of the device 10 is based precisely on the fact that, during the orbital movement about the axis X10, the gripping elements 12 are able to modulate their peripheral speed so as to carry out the action of repitching in the terms recalled previously. In describing the aforesaid path of orbital movement about the axis X10, the gripping (or, indifferently, conveying) elements 12 are likewise able to rotate about the respective principal axes X12 (directed radially with respect to the axis X10) so as to impart the action of turning on the product.

Figure 2:
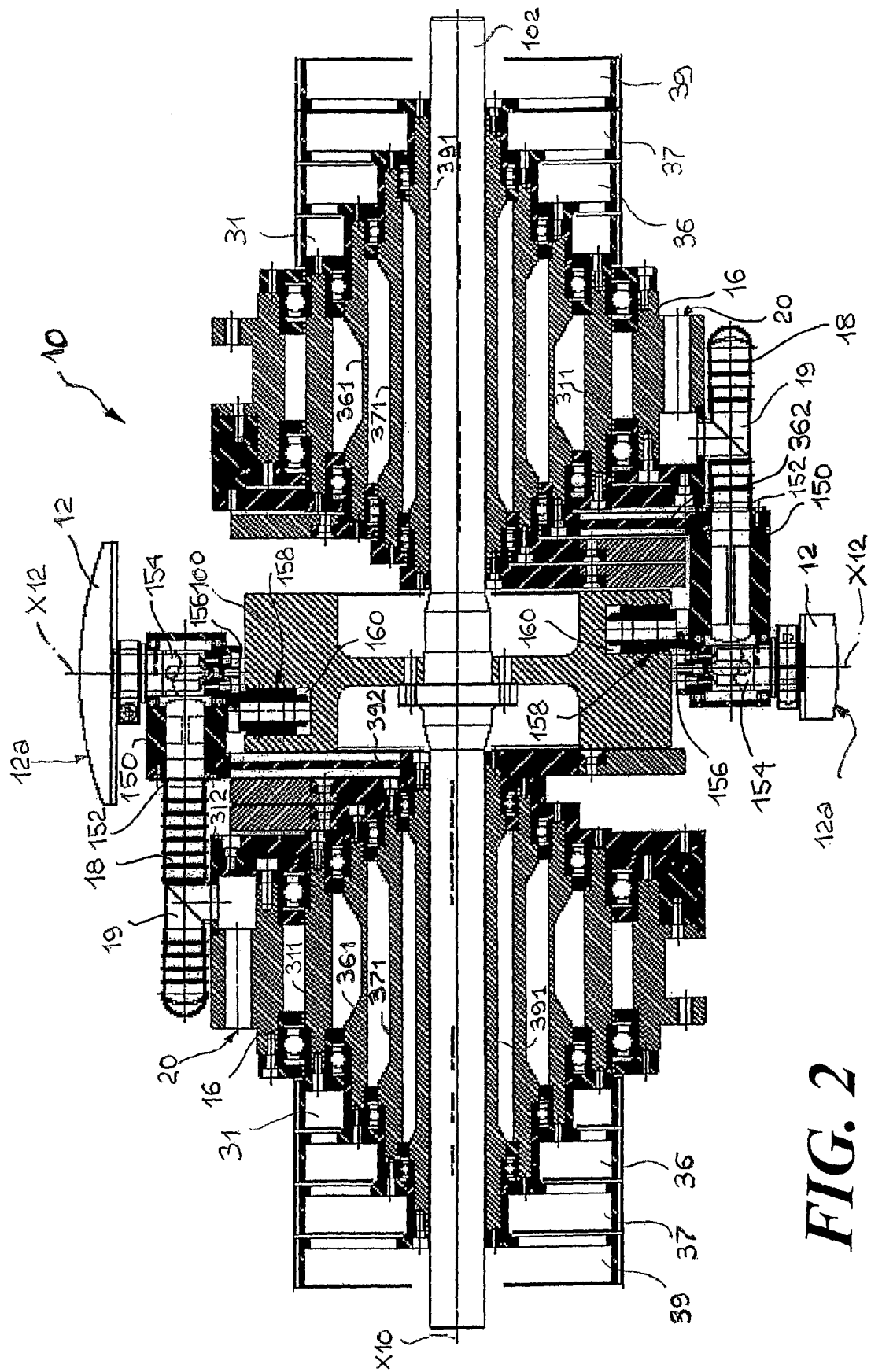
FIG. 2 is an axial cross section substantially according to the line II-II of FIG. 1.
Figure 4:
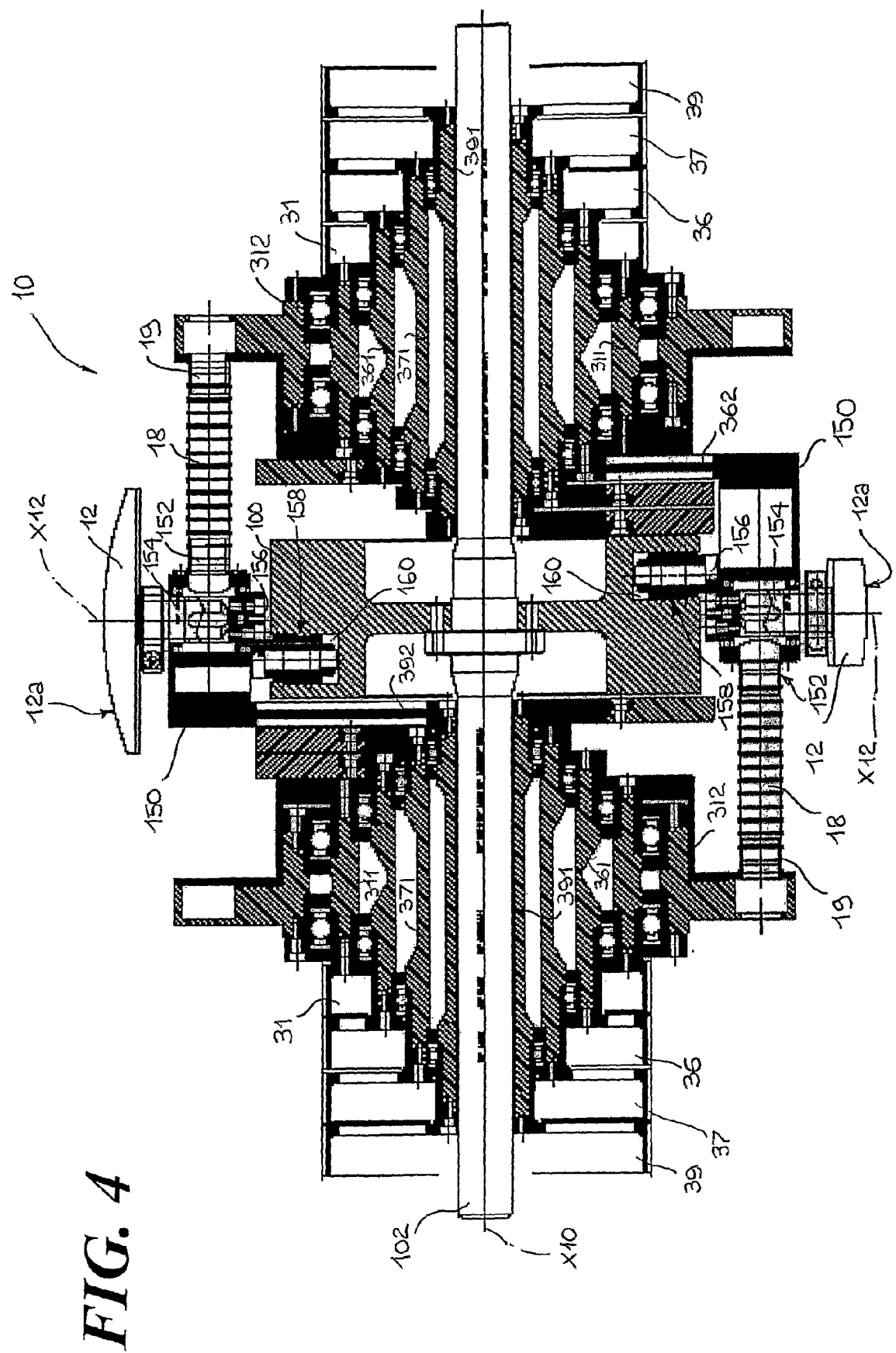
FIGS. 4 and 5 illustrate, in axial cross sections corresponding to the axial cross section of FIG. 2, possible variants of embodiment of the solution described herein.
Figure 5:
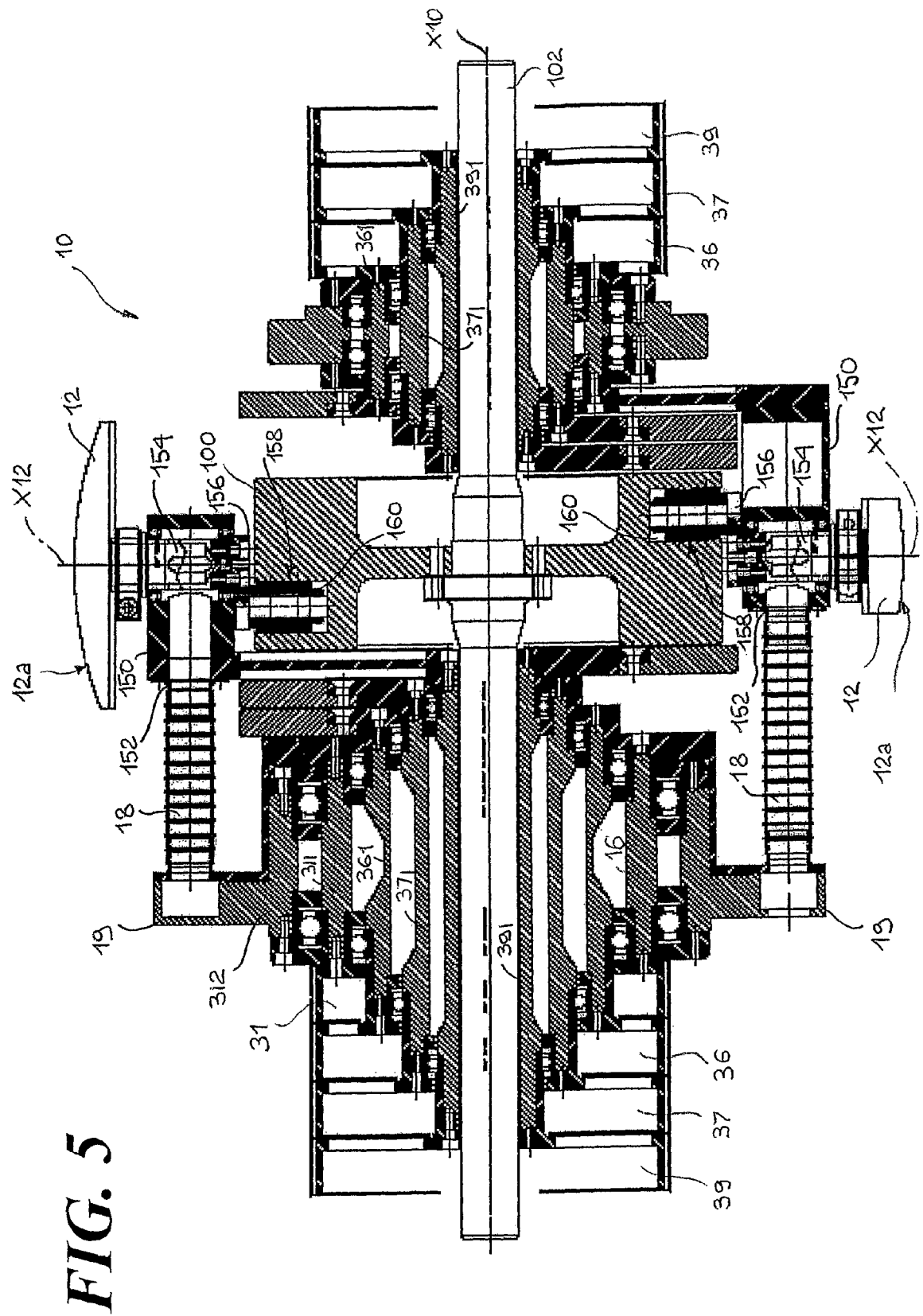

In the specific case illustrated herein (which corresponds to the currently preferred embodiment) and as may be appreciated more fully in the cross sections of FIGS. 2, 4 and 5, the device 10 basically comprises two units arranged symmetrically on opposite sides with respect to a central cam-holder disk or drum 100 carried by a shaft 102, herein assumed as extending in the horizontal direction.

Albeit designed to remain normally fixed during operation of the device 10, the shaft 102 is designed to rotate in the step of assembly of the device and (according to modalities that will emerge more clearly in what follows) in the step of regulation of the points of gripping T and of release G of the articles A.

Each of the units in question carries three gripping elements 12, "ideally" distributed with angles of separation of 120° about the peripheral development of the device 10, with the two sets of three gripping elements 12 of the two units in turn staggered angularly by 60° about the axis X10.

Even though preferential, this choice is in no way imperative. The device 10 could in fact comprise just one of the aforesaid units (hence adopting a structure that is as a whole similar to the one described in the European patent application No. 05425692.0, which amongst other things comprises four gripping elements 12, "ideally" distributed with angles of separation of 90°), with the structure of the disk or drum 100 simplified accordingly.

Of course, it is also possible to imagine recourse to a modular configuration that envisages use of:

two units carrying respectively one number (n1) of gripping elements and another number (n2) of gripping elements 12, for a total of n1+n2=m gripping elements 12 (with the preferred condition that n1=n2=m/2), when rather intense flows of articles in terms of articles per unit time are to be treated with a relatively contained repitching "dynamics" (i.e., difference between output pitch P2 and input pitch P1); and just one of said units carrying n1 or n2 gripping elements 12, when less intense flows of articles are to be treated but with a higher dynamics of repitching: all other factors being equal, that dynamics is in fact linked to the angular range on which the gripping elements 12 can "hunt" during the orbital movement about the axis X10; said angular range is evidently all the wider the lower the number of gripping elements 12 involved.

Again, it is possible to consider using two symmetrical units, as illustrated in the annexed drawings, each of which carries n=m/2 gripping elements 12, but in which only the n gripping elements of one of the units are able to rotate about their axis X12. This solution is usable, for example, in the case where just one article A out of two is to be subjected to rotation.

The cases expressly cited previously are of course only some of the possibilities afforded by the solution described herein.

For evident reasons of synthesis, the detailed description that follows is made in relation to just one of the two units represented in the figures of the annexed drawings, it remaining understood that, except when indicated otherwise, what has been said regarding this unit applies also to the other.

The gripping elements 12 act on the articles exerting thereon an action of "suction". This effect is usually obtained, in a known way, by providing the elements 12 with a hollow structure and a radially outer wall 12a (usually having a curved, roughly tile-like, development) that is an apertured structure, i.e., provided with an array of openings. The internal cavity of the elements 12 may be connected selectively to a vacuum line (i.e., a subatmospheric-pressure line), in such a way that in each element 12 the condition of suction (or "vacuum"):
  is activated just before gripping of the article A in the area of gripping or picking-up T;
  remains active to keep the product attached to the element 12 along the path from by the area T to the area of deposit or release G; and
  is deactivated just before release of the article A in the area G.

Consequently, reasoning also here in general terms, the device 10 comprises members of distribution of the subatmospheric pressure to at least one conveying element 12 to enable said element 12 to exert selectively an action of suction on the articles A.

Except for what is specifically described in what follows, the criteria of implementation and the principles of operation, of which mention was made previously, are to be deemed certainly known in the art and hence such as not to require any detailed description herein.

The device 10 can comprise any number of elements 12: from one to quite a high plurality. The choice of using three elements 12 for each unit, for a total of six elements 12, as represented in the attached plate of drawings, is currently considered preferential in so far as it meets very well the needs of efficiency of operation with the desirableness of having available a device 10 with a structure that is as a whole simple.

Each element 12 is able to describe a path of orbital movement about the axis X10 with a law of movement (acceleration and deceleration—i.e., "hunting"—with respect to a mean angular velocity ω), dictated by a respective drive pulley. Said drive pulley is moved through a transmission, for example a belt transmission, by a respective motor-drive (not illustrated in the drawings, but of a known type).

In the examples of embodiment illustrated in the annexed plate of figures, where each unit comprises three elements 12, three drive pulleys 39, 37 and 36 are present, arranged on the "outer" side of the device 10.

Of course, the pulleys can be replaced by other rotating bodies usable for a function of transmission of motion. For example, instead of pulleys, toothed gears can be used so as to eliminate also possible errors due to the elasticity of the belts (which are usually cogged) used for driving the pulleys.

The pulleys 39, 37 and 36 (in what follows we shall continue to make reference to the solution with pulleys, which has the advantage of simplicity) drive the elements 12 through a set of coaxial hollow shafts or quills, all of which can turn about the axis X10.

With initial reference to the cross-sectional view of FIG. 2, the pulley 39 is mounted on one (rear) end of a hollow shaft 391, fitted rotatably about the central camshaft 102, designed usually to remain in a fixed position during operation of the device 10.

The shaft 391 carries, at its front end, an arm 392 that extends radially from the axis X10 and carries at its distal end one of the elements 12.

The pulley 37 is mounted on one (rear) end of a hollow shaft 371, fitted on the central shaft 391 and can turn freely thereon. The hollow shaft 371 carries at its front end an arm 372 (visible in part in FIG. 1), which extends radially from the axis X10 in a position set alongside—on the inside of the device 10—the arm 392 and carries a second element 12.

The pulley 36 is mounted on a (rear) end of a hollow shaft 361, fitted about the shaft 371 and is free to turn thereon. The hollow shaft 361 carries on its front end an arm 362 that extends radially from the axis X10 in a position set alongside—on the inside of the device 10—the arm 372 and carries the third element 12.

Of course, the mechanical congruence of the ensemble illustrated and the capacity of rotation with respect to the axis X10 in the terms previously described is ensured by the presence of bearings, lubrication ducts, and seal members clearly visible in the cross-sectional views of FIGS. 2, 4 and 5. Said components are not described herein in detail in so far as their presence, location and sizing correspond to the execution of normal design tasks by the person skilled in the sector.

From what has been said previously it emerges that the pulleys 39, 37 and 36 are able to impart on the corresponding arms 392, 372 and 362 (and hence on the gripping elements 12 carried thereby) laws of orbital movement about the axis X10—and consequently laws of acceleration/deceleration with respect to the reference angular velocity ω—that are altogether free and virtually independent of one another, at the same time there remaining the need to prevent the arms 392, 372 and 362 from interfering with one another.

Each of the two units that make up the device 10 described herein comprises in fact arms 392, 372 and 362 equal in number to the elements 12 (here three) carried by the unit. Each arm hence has a drive shaft 391, 371 and 361 of its own and an independent motor-drive of its own, the motion of which is received through the pulleys 39, 37 and 36.

The structure with coaxial shafts 391, 371 and 361 is completed by a further element: a pulley 31 is in fact mounted on one (rear) end of a further hollow shaft 311, fitted about the shaft 361, and is free to turn with respect thereto. The hollow shaft 311 is mounted so that it can turn (once again via bearings) within a tubular sleeve 16 fixed to a vertical supporting plate (not illustrated), thus ensuring support of the device 10 as a whole by the framework of the machine of which it forms part.

The shaft 311 carries an annular distributor 312 with an outer radial dimension approximately corresponding to the radial dimension of the orbital path traversed by the elements 12 about the axis X10. The distributor 312, which is located in a position set alongside—on the inside of the device 10—the orbital path of the elements 12, is thus also able to rotate about the axis X10 with a speed determined by the speed of rotation of the respective pulley 31.

Typically, the distributor 312 is made to rotate (by the motor—not illustrated—that drives the pulley 31) at a constant speed, i.e., at the reference angular velocity ω and "in phase" with the line comprising the conveyors C1 and C2.

In particular, if—as illustrated in the annexed drawings—on each unit three elements 12 (for a total of six elements 12) are present and, the rate of the line is N articles/minute, the speed of rotation of the distributor will be N/6 r.p.m.

The reference number 18 designates flexible hoses (for example, made of rubber or similar elastomer, or else so-called "spiralled" hoses, or else again articulated tubes), each of which connects one of the elements 12 to the distributor 312 via a corresponding pipe union 19.

The flexible hoses 18 form part of the "pneumatic" section of the device 10, i.e., of the plant that enables application to the elements 12, in a way that is co-ordinated with their angular position, a level of subatmospheric pressure or "vacuum" in such a way that, in each element 12, the condition of suction ("vacuum") is activated just before gripping of the article A in the area of gripping or picking-up T, remains active to keep the product attached to the element 12 during the path from the area T to the area of deposit or release G, and is deactivated just before release of the article A in the area G.

For this purpose, the pipe unions 19 are mounted at openings of the distributor 312, which, as a result of the rotation of the distributor 312 about the tubular sleeve 16 (functioning as manifold) periodically face ducts 20 provided in the tubular sleeve 16 that is connectable to a subatmospheric-pressure line (vacuum line).

As a result of the rotation of the distributor 312 around the aforesaid manifold (and on the basis of criteria in themselves known—see, for example, the document No. EP-A-1 179 495, already cited previously) each tube 18 will be exposed to a level of atmospheric or subatmospheric pressure according to the portion of the manifold in which the corresponding pipe union 19 is currently located as a result of the rotation of the distributor 312. Said level of atmospheric or subatmospheric pressure will then be transmitted to the respective element 12 with the mechanism described more fully in what follows.

The fact that the pipes or hoses 18 are flexible means that each of the arms 392, 372, 362 that carries an element 12 is free to move angularly with respect to the corresponding supply pipe union 19, with a wide range of angular displacement so as to enable "hunting" in terms of speed with respect to the mean angular velocity of the device 10 itself, which results in a wide range of possible accelerations/decelerations that can be used for the purposes of the action of repitching.

The solution described herein exploits, in particular with reference to the shafts 391, 371, 361 and 311 (and to the members 12 and 312 carried thereby) the possibility of providing with electronically controlled motor-driven shafts (through the pulleys 39, 37, 36 and 31) profiles of speed that are variable and controlled through 360° of rotation of the shaft itself. The aforesaid profiles of speed are readily adaptable, electronically, to articles A of different format: in this way, the need is avoided of providing, for each format of article A, a specific repitching unit.

In the solution described herein, the elements 12 are mounted on the corresponding arms with the capacity of orientation about the respective principal axes X12 so as to be able to exert on the articles A, in addition to the action of repitching, also an action of rotation in the passage from the conveyor C1 to the conveyor C2.

For this purpose, the distal portions of the arms that carry the elements 12 (in what follows, this description will provided in detail just for the arms 392 and 362, it remaining understood that similar descriptions apply also to the other arms) comprise a hollow terminal portion 150, for example with a boxlike structure that extends in a direction parallel to the axis X10. The terminal portion constitutes a closed cavity communicating, via a connector 152, with the flexible hose 18. The level of "vacuum" (subatmospheric pressure) possibly present in the pipe 18 can then propagate within the hollow part 150.

The hollow terminal portion 150 is then traversed, in a radial direction with respect to the axis X10, and hence in the direction of the axis X12, by a hole in which a usually tubular hollow shaft 154 is mounted so that it can turn in a fluid-tight way (thanks to the presence of o-rings not visible in the drawings).

The end of the shaft 154 that is radially external with respect to the device 10 carries the element 12, which is thus rendered orientable about the axis X12. Furthermore, the wall of the shaft 154 is traversed by radial holes or slots communicating with its axial cavity, which in turn communicates with the internal cavity of the element 12. It follows that the level of subatmospheric pressure possibly prevailing in the cavity of the terminal portion 150 (as a result of the connection to the flexible hose 18) can propagate towards the inside of the conveying element 12.

The end of the shaft 154 that is radially internal with respect to the device 10 carries, instead, a crank arm 156, which thus enables control of orientation of the element 12 about the axis X12.

Figure 3:
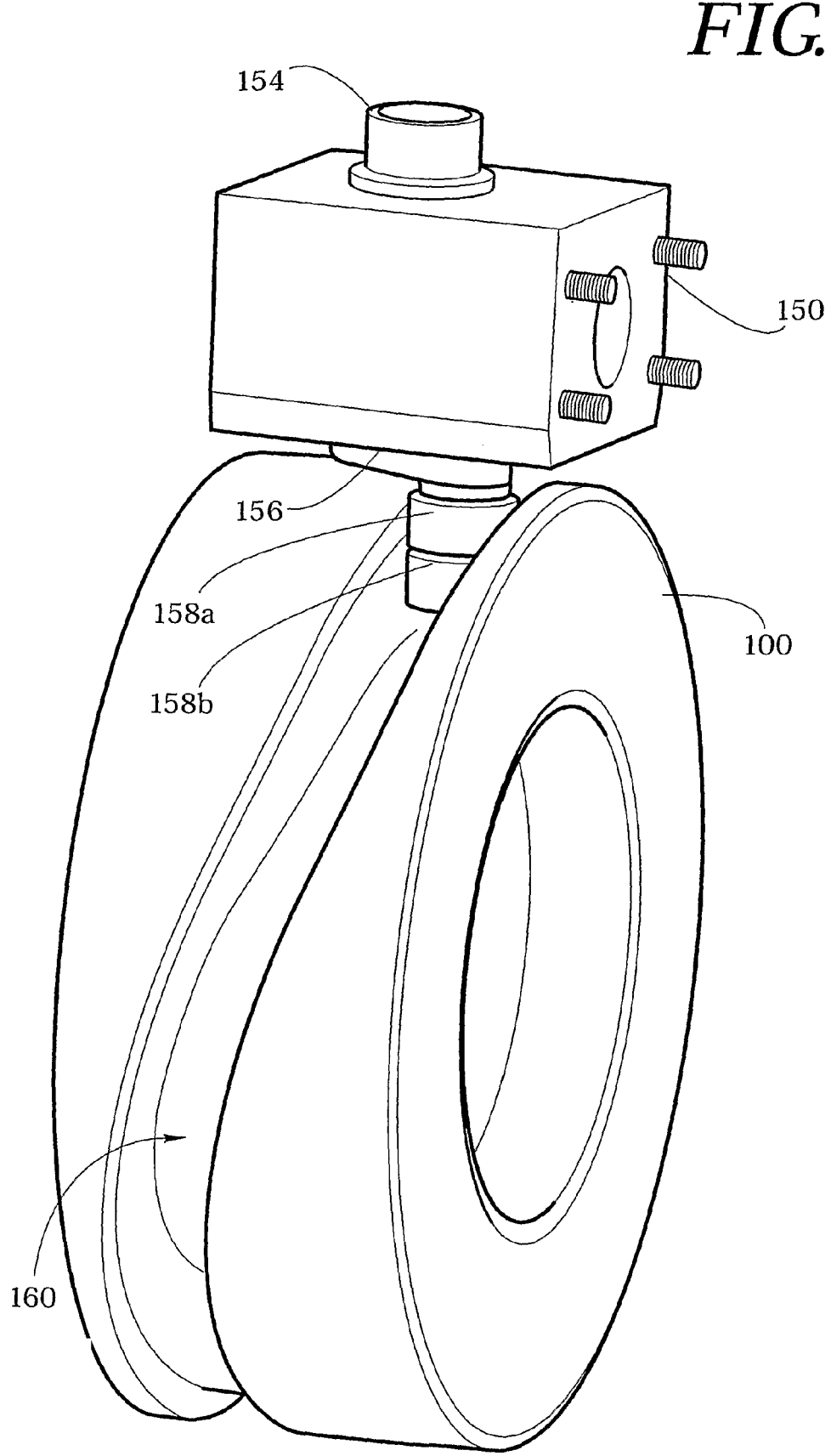
FIG. 3 illustrates a detail of embodiment of the solution illustrated in FIGS. 1 and 2.

The distal end of the crank arm 156 carries a cam-follower element 158. As may be appreciated more fully in the view of FIG. 3, which is designed to illustrate specifically the characteristics of the disk or drum 100 that carries the cam formation 160 and of the parts of the device 10 co-operating therewith, the cam-follower element 158 preferentially comprises two rolling bodies 158a, 158b, such as wheels, rollers or bearings which can engage by sliding/rolling a respective groove 160 provided on the outer surface of skirt of the disk or drum 100.

The choice of providing the cam-follower element 158 with (at least) two rolling bodies is preferred in so far as the cam 160 is a simple furrow or groove. A single rolling body would engage in fact alternatively only the left-hand shoulder or the right-hand shoulder of the cam 160 that generates the rotation of the conveying element 12 about the axis X12. For the rolling body to be able to slide freely in the furrow functioning as cam it is necessary for the furrow itself to have a width greater than the diameter of the rolling body. The play that derives therefrom in the case of a single rolling body results in an increase in the error of rotation of the element 12, and hence in an error of positioning of the article A carried thereby. Furthermore, the change of surface of contact is a cause of change of direction of rotation of the rolling body. Since these changes of rotation are sudden, in a non-lubricated, dirt-resistant environment there are phenomena of particularly fast wear both of the cam and of the rolling body.

The fact of using a follower system with a number of rolling bodies enables having a single rolling body in contact always and only with one face or shoulder of the furrow 160 functioning as cam. There may then be more stringent tolerances in so far as the face or shoulder that does not engage the rolling body or the wheel is provided at quite some distance from the rolling body itself, whilst the two working faces of the furrow 160, given that they are staggered, can be provided at a distance from one another exactly equal to the diameter of the rolling bodies 158a, 158b. From this there also derives the fact that each rolling body always rolls in the same direction, without sliding, consequently eliminating the aforesaid phenomena of wear.

As already said, during operation of the device, the distributor 312 rotates about the axis X10 at the (constant) "line" speed identified by the speed of advance of the articles A. The shafts 391, 371 and 361 that carry the arms with the elements 12 are instead made to rotate about the axis X10 at a speed where the phenomenon of hunting (periodic acceleration and deceleration) underlying the mechanism of repitching that causes change of pitch between the articles A is superimposed upon the "line" component.

As a consequence of this, the arms 392, 372, 362 are found periodically to advance and recede angularly with respect to the disk 312.

At the same time, each cam follower 158 (preferentially made up, as has been seen, of two rolling bodies) slides in the respective groove 160. The profile of the groove, functioning as cam profile, hence determines, for each angular position that can be assumed by the arms 392, 372, 362 with respect to the disk 100, a corresponding orientation of the corresponding element 12 about the axis X12.

By choosing the profile of the groove 160 along the contour of the disk or drum 100, it is hence possible to impose upon the elements 12 to follow a particular law of orientation about the respective axis X12 in the passage from the position of picking-up T to the position of release G of the articles A.

For instance, with reference to the example represented in FIG. 1 and FIG. 2 it is possible to choose the profile of the groove 160 in such a way that:

when the arms with the elements 12 come to occupy the area or position T for picking up the articles A, the elements 12 themselves are oriented in a circumferential direction with respect to the axis X10, so as to present with an orientation concordant with the articles A that advance "lengthwise" on the conveyor C1, from which they are picked up;

whilst the arms with the elements 12 describe their orbital path about the axis X10 designed to bring the articles A to the position of release G, the elements 12 start to rotate about the axes X12, orienting themselves gradually in the direction of the axis X10; and when they arrive in the area or position G of release of the articles A, the elements 12 are oriented along the axis X10 so as to be able to transfer onto the conveyor C2, with the right orientation, the articles A that are to advance "crosswise" on the conveyor C2 itself.

The purpose of the above is to cause the articles A, in the course of their orbital path about the axis X10, not only to see their pitch modified (repitching function) but also to be rotated through 90° with respect to their direction of advance (turn function).

It will be appreciated that the aforesaid result in terms of rotation is obtained in a way altogether independent of the modalities of carrying-out the repitching function, i.e., of the kinematic law according to which the arms with the elements 12 hunt, for example, "backwards" (i.e., they move with an angular velocity lower than the angular line velocity followed by the distributor) in the area of picking-up T, and then hunt "forwards" (i.e., they move with an angular velocity higher than the angular line velocity followed by the distributor) in the area of release R so as to bring the articles A closer to one another, so reducing their pitch, or else do the opposite to obtain the opposite effect.

In other words, in the solution described herein:

the elements 12 (which can be any in number) describe a path of orbital movement about the principal axis X10 between the position of picking-up T and the position of release G of the articles A;

the speed of the orbital movement is selectively variable (by acting on the motor drives of the pulleys 39, 37, 36) in the passage between the aforesaid positions of picking-up T and of release G so as to modify the pitch between the articles A carried by the elements 12;

the conveying elements 12 are likewise orientable about a respective axis X12 oriented in a radial direction with respect to the principal axis X10 so as to modify the orientation of the articles A in the passage between the position of picking-up T and the position of release G;

there is present at least one cam formation 160, the cam profile of which follows the path of orbital movement of the conveying elements 12 about the principal axis X10; and the conveying element 12 or each conveying element 12 is provided with a cam-follower element 158 (usually comprising two rolling bodies 158*a*, 158*b*), which can co-operate in a cam-follower relationship with the aforesaid cam formation 160 for determining the orientation assumed by the respective conveying element 12 in the position of picking-up T and of release G, irrespective of the velocity of the aforesaid orbital movement.

Of course, the profile of the cam 160 can be chosen in such a way that, in the course of their orbital path about the axis X10, the elements 12 (and hence the articles A carried thereby) are rotated by a angle other than 90° about the axes X12, for example through an angle of 180°.

It will be appreciated then that, in the solution described herein, the repitching function (controlled by acting, via the pulleys 39, 37 and 36, on the laws of "hunting" 392, 372 and 362) is adaptable in a simple and automatic way—intervening only on functions of control of the motor drives of the pulleys 39, 37 and 36, and hence without having to proceed to replacement of parts—to articles of different format ("change of format") and/or to different values of pitch between the incoming and outgoing articles.

The adaptation of the repitching function does not affect the execution of the turn function controlled basically by the profile of the cam 160. In a dual way, the criteria of execution of the turn function can be modified adopting a different profile for the cam 160, without this affecting the execution of the repitching function. At least in some applications with reduced dynamics of repitching, it is also possible to envisage in the groove 160 subsequent stretches, to which there correspond different laws of orientation of the elements about the axes X12, and to regulate the device so as to implement selectively different laws of operation by varying selectively the stretch of groove 160 with which the follower elements 158 come to co-operate.

This result is obtainable, for example, by causing the disk or drum 100 to rotate about the axis X10 by imparting a corresponding rotation on the shaft 102 during regulation of the device in view of the subsequent activation. It will be appreciated that the possibility of orientation of the disk or drum 100 about the axis X10 also enables precise regulation of the angular position about the axis X12 assumed by the elements 12 in the position of picking-up T and of release G of the articles A.

The structure of the device 10 is as a whole simple, with a reduced presence of members co-operating in relative motion with one another. The device described herein is able to carry out a large number of working cycles per unit time without undergoing early phenomena of wear. This applies in particular to the pipes or hoses 18, the flexibility of which is exploited to enable "hunting" of the arms that carry the elements 12, whilst—as regards the movement of orientation of the elements 12 about the axes X12—the function of connection with fluid-tightness to subatmospheric pressure is entrusted to the articulating joints of the shafts 154 to the hollow terminal portions 150 of the arms.

The views of FIGS. 4 and 5 (where elements and/or parts that are identical and/or equivalent to the ones already described with reference to FIGS. 1 and 2 are designated by the same references that appear in FIGS. 1 and 2) exemplify some variants of embodiment that involve principally the sizing and relative location of the parts.

In particular, the view of FIG. 4 highlights the possibility of "reversing" the roles of the distributors 312 associated to the units arranged on the two sides of the disk or drum 100 that carries the cam or cams 160.

The view of FIG. 5 highlights, instead, the possibility of using a single distributor 312 for selective application of the subatmospheric pressure ("vacuum") to the elements 12 associated to both of the units arranged on the two sides of the disk or drum 100 that carries the cam or cams 160.

It follows that, without prejudice to the principle of the invention, the details of construction and the embodiments may vary widely with respect to what is described and illustrated herein, without thereby departing from the scope of the present invention, as defined by the annexed claims.

The invention claimed is:

1. A device for changing the pitch between articles in a flow of moving articles, the device comprising:
    at least one conveying element for conveying the articles, said element adapted to describe a path of orbital movement about a principal axis between a position of picking-up and a position of release of the articles, the speed of said orbital movement being selectively variable in the passage between said positions of picking-up and of release so as to modify the pitch between said articles in the passage between said position of picking-up and said position of release; said at least one conveying element being likewise orientable about a respective axis, oriented in a radial direction with respect to said principal axis so as to modify the orientation of said articles in the passage between said position of picking-up and said position of release;
    a cam formation with a cam profile that follows said path of orbital movement of said at least one conveying element for conveying the articles about said principal axis; and
    at least one cam-follower element, carried by said at least one conveying element for conveying the articles; said at least one cam-follower element being able to co-operate in a cam-follower relationship with said cam formation for determining the orientation assumed by said at least one conveying element in said position of picking-up and said position of release, irrespective of the speed of said orbital movement,
    wherein said cam-follower element comprises at least two rolling bodies co-operating with said cam profile,
    wherein said cam formation comprises a furrow or groove with staggered sides, each designed to co-operate with a respective one of said at least two rolling bodies.

2. The device according to claim 1, wherein:
    said at least one conveying element for conveying the articles is carried by an arm, said arm rotary about said principal axis so as to cause said at least one conveying element to follow said path of orbital movement between said position of picking-up and said position of release of the articles,
    members are provided for distribution of subatmospheric pressure to said at least one conveying element for transferring said subatmospheric pressure to said at least one conveying element to enable said at least one conveying element to exert selectively an action of suction on said articles, said members for distribution of subatmospheric pressure comprising a distributor, rotatable about said principal axis with:
    i) a flexible hose between said rotary distributor and said arm carrying said at least one conveying element, the flexibility of said flexible hose enabling relative angular orientation between said distributor and said arm carrying said at least one conveying element with respect to said principal axis; and
    ii) a fluid-tight articulating-joint connection between said arm and said at least one conveying element carried thereby.

3. The device according to claim 2, wherein:
    said arm carrying said at least one conveying element has a hollow part connected to said flexible hose for receiving said subatmospheric pressure;
    said at least one conveying element is carried by a shaft coupled, so that it can turn, to said hollow part, said shaft being provided with cavities for transferring said subatmospheric pressure to said at least one conveying element.

4. The device according to claim 2, wherein said distributor is annular in shape and is set in a position alongside the path of orbital movement of said at least one conveying element.

5. The device according to claim 1, comprising a plurality of said conveying elements, carried by a plurality of respective coaxial shafts, rotatable about said principal axis.

6. The device according to claim 1, wherein said respective members for control in rotation comprise rotating bodies.

7. The device according to claim 6, wherein the rotating bodies are pulleys or toothed gears.

8. The device according to claim 6, wherein the rotating bodies are along side one another.

9. The device according to claim 7 wherein the pulleys or toothed gears are along side one another.

10. A device for changing the pitch between articles in a flow of moving articles, the device comprising:
    at least one conveying element for conveying the articles, said element adapted to describe a path of orbital movement about a principal axis between a position of picking-up and a position of release of the articles, the speed of said orbital movement being selectively variable in the passage between said positions of picking-up and of release so as to modify the pitch between said articles in the passage between said position of picking-up and said position of release; said at least one conveying element being likewise orientable about a respective axis, oriented in a radial direction with respect to said principal axis so as to modify the orientation of said articles in the passage between said position of picking-up and said position of release;
    a cam formation with a cam profile that follows said path of orbital movement of said at least one conveying element for conveying the articles about said principal axis; and
    at least one cam-follower element, carried by said at least one conveying element for conveying the articles; said at least one cam-follower element being able to co-operate in a cam-follower relationship with said cam formation for determining the orientation assumed by said at least one conveying element in said position of picking-up and said position of release, irrespective of the speed of said orbital movement,
    wherein:
    said at least one conveying element for conveying the articles is carried by an arm, said arm rotary about said principal axis so as to cause said at least one conveying element to follow said path of orbital movement between said position of picking-up and said position of release of the articles, members are provided for distribution of subatmospheric pressure to said at least one conveying element for transferring said subatmospheric pressure to said at least one conveying element to enable said at least one conveying element to exert selectively an action of suction on said articles, said members for distribution of subatmospheric pressure comprising a distributor, rotatable about said principal axis with:

i) a flexible hose between said rotary distributor and said arm carrying said at least one conveying element, the flexibility of said flexible hose enabling relative angular orientation between said distributor and said arm carrying said at least one conveying element with respect to said principal axis; and ii) a fluid-tight articulating-joint connection between said arm and said at least one conveying element carried thereby, and wherein:

said shaft, coupled, so that it can turn, to said hollow part, is provided with opposite ends, one external and the other internal with respect to the device;

said at least one conveying element is carried by the external end of said shaft; and said cam-follower element is coupled to the internal end of said shaft.

11. A device for changing the pitch between articles in a flow of moving articles, the device comprising:

at least one conveying element for conveying the articles, said element adapted to describe a path of orbital movement about a principal axis between a position of picking-up and a position of release of the articles, the speed of said orbital movement being selectively variable in the passage between said positions of picking-up and of release so as to modify the pitch between said articles in the passage between said position of picking-up and said position of release; said at least one conveying element being likewise orientable about a respective axis, oriented in a radial direction with respect to said principal axis so as to modify the orientation of said articles in the passage between said position of picking-up and said position of release;

a cam formation with a cam profile that follows said path of orbital movement of said at least one conveying element for conveying the articles about said principal axis; and at least one cam-follower element, carried by said at least one conveying element for conveying the articles; said at least one cam-follower element being able to co-operate in a cam-follower relationship with said cam formation for determining the orientation assumed by said at least one conveying element in said position of picking-up and said position of release, irrespective of the speed of said orbital movement, wherein:

said at least one conveying element for conveying the articles is carried by an arm, said arm rotary about said principal axis so as to cause said at least one conveying element to follow said path of orbital movement between said position of picking-up and said position of release of the articles, members are provided for distribution of subatmospheric pressure to said at least one conveying element for transferring said subatmospheric pressure to said at least one conveying element to enable said at least one conveying element to exert selectively an action of suction on said articles, said members for distribution of subatmospheric pressure comprising a distributor, rotatable about said principal axis with:

i) a flexible hose between said rotary distributor and said arm carrying said at least one conveying element, the flexibility of said flexible hose enabling relative angular orientation between said distributor and said arm carrying said at least one conveying element with respect to said principal axis; and ii) a fluid-tight articulating-joint connection between said arm and said at least one conveying element carried thereby, and wherein said distributor and said arm rotary about said principal axis are carried by respective coaxial shafts, rotatable about said principal axis.

12. The device according to claim 11, wherein said respective coaxial shafts are coupled to respective members for control in rotation.

13. A combination device comprising two devices for changing the pitch between articles in a flow of moving articles, each of the two devices comprising:

at least one conveying element for conveying the articles, said element adapted to describe a path of orbital movement about a principal axis between a position of picking-up and a position of release of the articles, the speed of said orbital movement being selectively variable in the passage between said positions of picking-up and of release so as to modify the pitch between said articles in the passage between said position of picking-up and said position of release; said at least one conveying element being likewise orientable about a respective axis, oriented in a radial direction with respect to said principal axis so as to modify the orientation of said articles in the passage between said position of picking-up and said position of release;

a cam formation with a cam profile that follows said path of orbital movement of said at least one conveying element for conveying the articles about said principal axis; and at least one cam-follower element, carried by said at least one conveying element for conveying the articles; said at least one cam-follower element being able to co-operate in a cam-follower relationship with said cam formation for determining the orientation assumed by said at least one conveying element in said position of picking-up and said position of release, irrespective of the speed of said orbital movement, and—wherein the two devices are arranged on opposite sides with respect to the path of said orbital movement about said principal axis, with the respective conveying elements angularly staggered with respect to said principal axis.

14. The combination device according to claim 13, comprising a cam-holder element common to said two devices arranged on opposite sides with respect to the path of said orbital movement about said principal axis.

15. The combination device according to claim 14, wherein said common cam-holder element is a drum or disk, which can be regulated in orientation about said principal axis.

16. The combination device according to claim 13, wherein each of said two devices is constructed such that:

said at least one conveying element for conveying the articles is carried by an arm, said arm rotary about said principal axis so as to cause said at least one conveying element to follow said path of orbital movement between said position of picking-up and said position of release of the articles, members are provided for distribution of subatmospheric pressure to said at least one conveying element for transferring said subatmospheric pressure to said at least one conveying element to enable said at least one conveying element to exert selectively an action of suction on said articles, said members for distribution of subatmospheric pressure comprising a distributor, rotatable about said principal axis with:

i) a flexible hose between said rotary distributor and said arm carrying said at least one conveying element, the flexibility of said flexible hose enabling relative angular orientation between said distributor and said arm carrying said at least one conveying element with respect to said principal axis; and ii) a fluid-tight articulating-joint connection between said arm and said at least one conveying element carried thereby;

and wherein the combination device has a single rotary distributor rotatable about said principal axis common to said two devices arranged on opposite sides with respect to the path of said orbital movement about said principal axis.

17. A device for changing the pitch between articles in a flow of moving articles, the device comprising:

at least one conveying element for conveying the articles, said element adapted to describe a path of orbital movement about a principal axis between a position of picking-up and a position of release of the articles, the speed of said orbital movement being selectively variable in the passage between said positions of picking-up and of release so as to modify the pitch between said articles in the passage between said position of picking-up and said position of release; said at least one conveying element being likewise orientable about a respective axis, oriented in a radial direction with respect to said principal axis so as to modify the orientation of said articles in the passage between said position of picking-up and said position of release;

a cam formation with a cam profile that follows said path of orbital movement of said at least one conveying element for conveying the articles about said principal axis; and at least one cam-follower element, carried by said at least one conveying element for conveying the articles; said at least one cam-follower element being able to co-operate in a cam-follower relationship with said cam formation for determining the orientation assumed by said at least one conveying element in said position of picking-up and said position of release, irrespective of the speed of said orbital movement, and wherein the device comprises a central shaft carrying said cam formation with at least one hollow shaft, fitted about said central shaft and carrying said at least one conveying element.

* * * * *